May 8, 1962 S. G. MARRIOTT 3,033,099
TOASTER FOR BUTTERED BUNS
Filed March 23, 1959 3 Sheets-Sheet 1
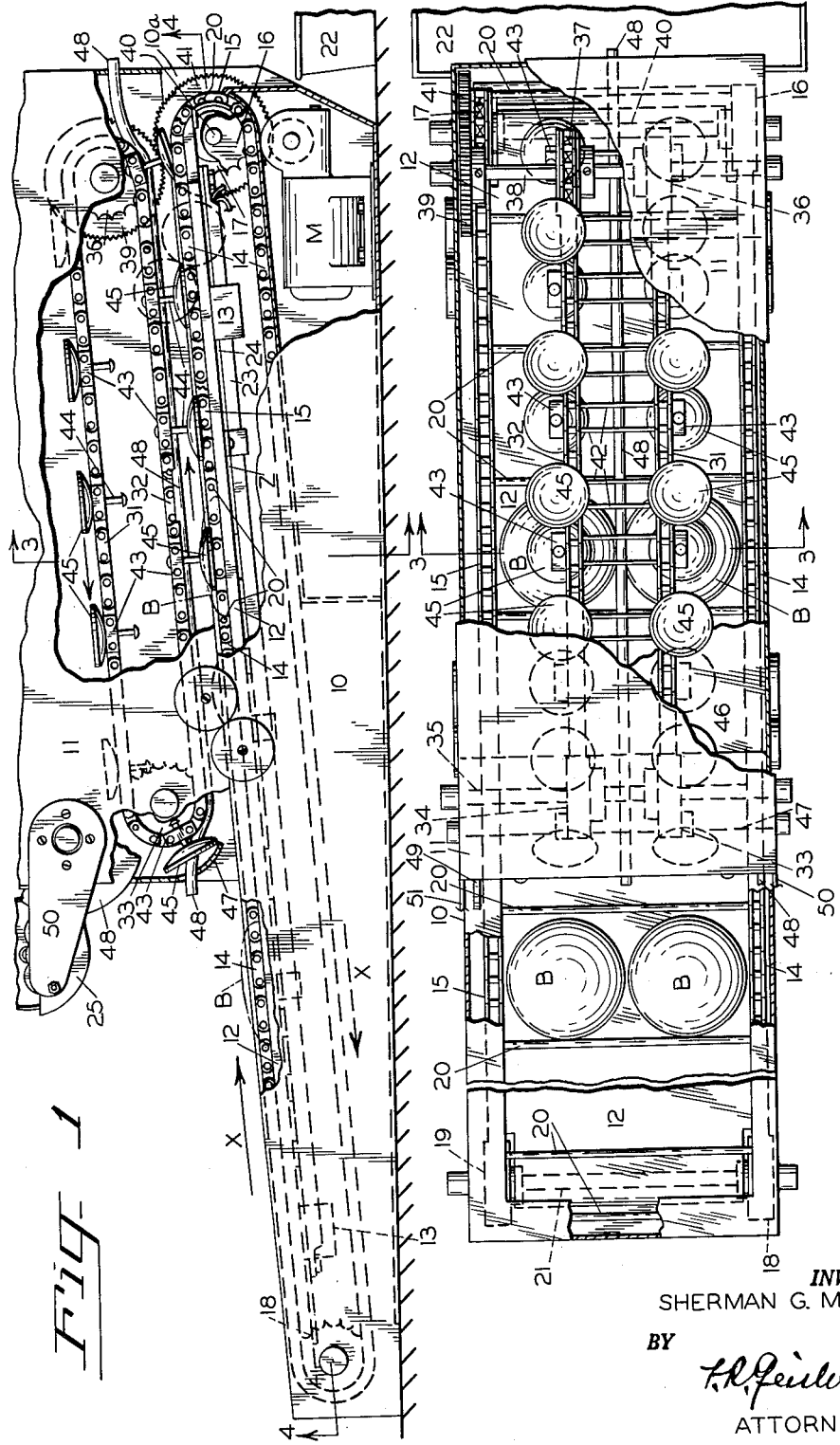
INVENTOR.
SHERMAN G. MARRIOTT
BY
*T. R. Geisler*
ATTORNEY May 8, 1962 — S. G. MARRIOTT — 3,033,099
TOASTER FOR BUTTERED BUNS
Filed March 23, 1959 — 3 Sheets-Sheet 2

INVENTOR.
SHERMAN G. MARRIOTT
BY
ATTORNEY

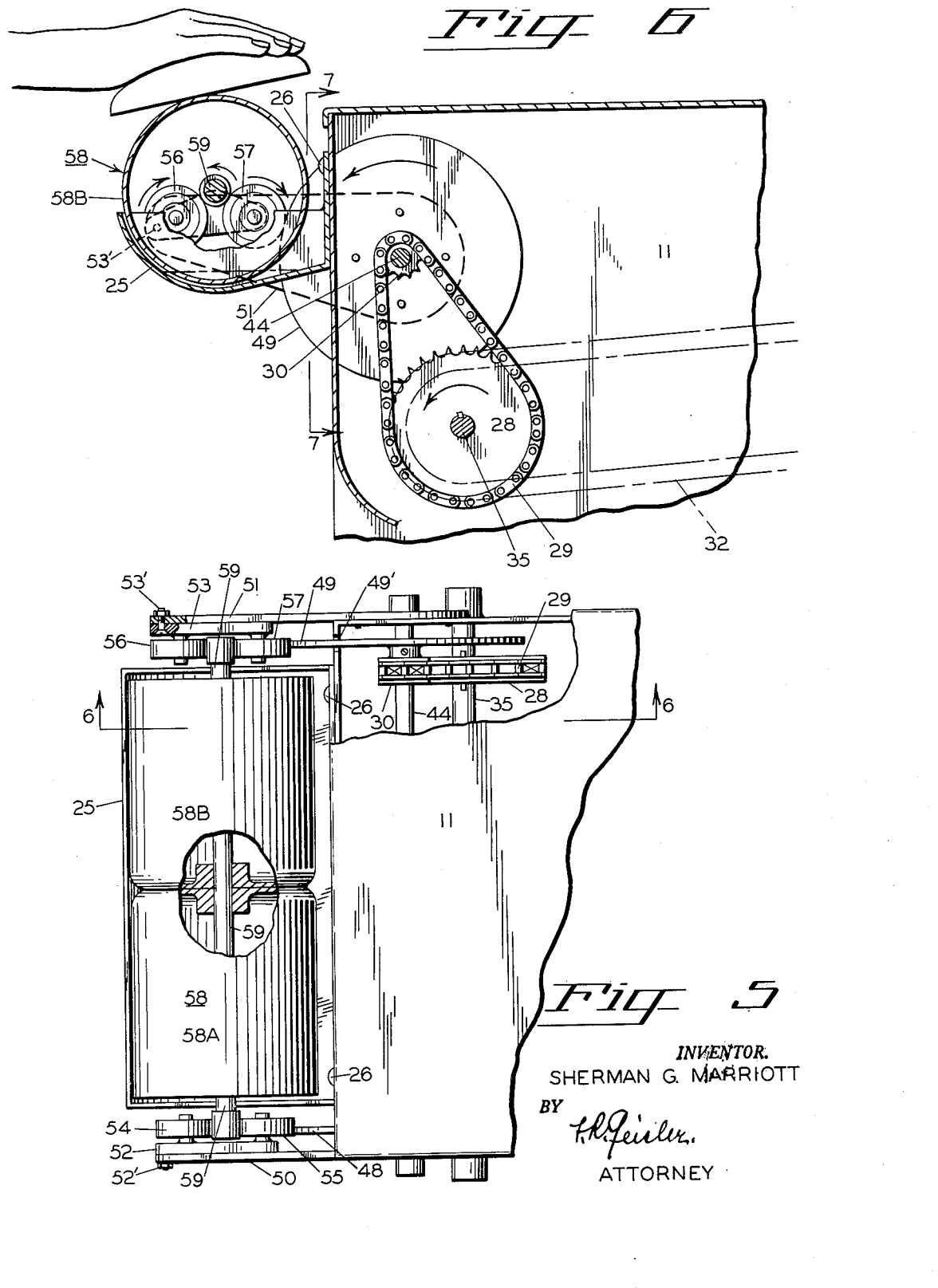

United States Patent Office 3,033,099
Patented May 8, 1962

3,033,099
TOASTER FOR BUTTERED BUNS
Sherman G. Marriott, 3800 NE. Alameda, Portland, Oreg.
Filed Mar. 23, 1959, Ser. No. 801,090
3 Claims. (Cl. 99—349)

This invention relates to the toasting of sliced bread buns for use in the making of the popular "hamburger" sandwiches and the like.

When making such a sandwich it is generally customary to toast the sliced faces of the two bun-halves, while heating the bun-half through, before the filling for the sandwich is placed between the bun-halves. It is also customary to butter the sliced faces of the bun-halves. While previously the buttering of the bun-halves was generally done after the toasting, more recently the practice of buttering the bun-halves before toasting has become the preferred method due mainly to the fact that the toasting of the bun with the butter already on the face which is being toasted adds considerably to the final resulting flavor of the toasted bun. The present invention relates in particular to the toasting of bun-halves after the sliced faces to be toasted have first been buttered.

The toasting of buttered bun-halves on toasting machines of the types at present employed in restaurants and at lunch counters has not proved to be very satisfactory due mainly to the fact that deposits of melted butter onto the heated metal grill or toasting surfaces of these machines quickly become scorched and burned and not only spoil the flavor of the buns as the buns are moved along over the hot toasting metal surface, but, unless the machine is stopped frequently and such deposits removed before they accumulate too much, the accumulation of burned grease, when the toasting machine is in constant use, will also clog the machine to such extent as entirely to prevent further operation, thus necessitating the shutting down of the machine for considerable time for extensive cleaning and possible repair.

A particular object of the present invention is to provide an improved bun toaster in which little if any burning of butter deposits from the buns can occur.

A related object of the invention is to provide an improved bun toaster in which deposits of butter on the heated toasting surface will not remain in one place to accumulate there.

Another object of the invention is to provide an improved bun toasting machine in which the heating of the toasting surface will be varied at different points along the surface to correspond to the heating and toasting stages through which the buttered buns pass thus avoiding excessive heating of the buttered bun faces before the butter has had sufficient opportunity to penetrate into the bun.

A further object of this improved toaster is to provide a simple and practical butter applicator by means of which the operator can easily and quickly apply a proper amount of butter to the sliced face of a bun-half as he places the bun-half on the toaster.

In the toasting of sliced buns it is customary to have weights placed on the tops of the inverted bun-halves to press the sliced faces down on the toasting surface to overcome the tendency of the cut faces to become concave while being heated. However, a weight which is suitable for some buns, such as day old buns, may be too heavy for very fresh, soft buns. Therefore an additional object of the present invention is to provide a control for the bun weights in the toaster to accommodate bun-halves of different softness.

The manner in which these objects and incidental advantages are obtained with the improved toaster of the present invention will be readily understood in the following brief description and explanation with reference to the accompanying drawings.

In the drawings:

FIG. 1 is an elevation of the major portion of the device with parts of the side wall of the outside housing broken away for clarity;

FIG. 2 is a foreshortened top plan view of the device corresponding to FIG. 1, with portions of the top wall broken away and with the butter pan and butter roller removed and the outer ends of the butter roller brackets broken away;

FIG. 5 is a fragmentary top plan view showing the butter roller, butter trough, and adjacent top portion of the housing, drawn to a larger scale, with part of the top of the housing broken away;

FIG. 6 is a fragmentary sectional elevation taken on line 6—6 of FIG. 5; and

Figure 3:
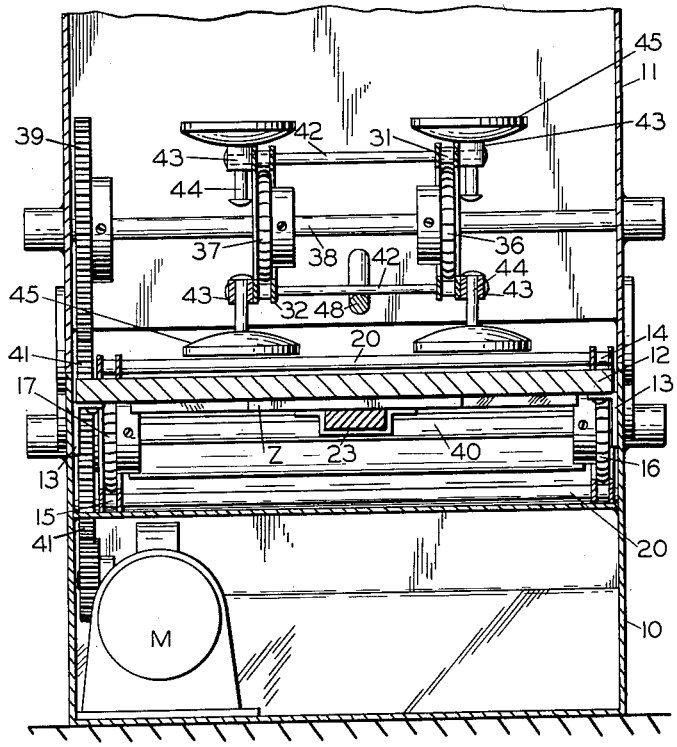
FIG. 3 is a section of line 3—3 of FIGS. 1 and 2.

Referring first to FIG. 1, the toaster includes a lower housing 10, comprising bottom, side and end walls, and an upper housing 11, comprising top, side and end walls. The upper housing is so arranged as to be removably set in place on the lower housing in the relative position shown in FIG. 1. An inclined toasting plate 12 is mounted in the top of the lower housing 10 and extends practically the entire length of the lower housing. The side walls of the lower housing are substantially trapezoidal in shape in order to have their top edges correspond to the slope of the toasting plate, and the side walls of the shorter upper housing 11 are also trapezoidal in shape, with the bottom edges of these walls corresponding to the same slope. The toasting plate 12 is secured in place by means of suitable brackets 13 attached to the side walls of the lower housing near the top edges of the walls.

The conveyor for sliding the bun-halves along the toasting plate consists of a pair of identical endless chains 14 and 15 (FIG. 2) which pass around a pair of driven sprocket wheels 16 and 17 secured on a shaft 40, and which pass around a pair of sprocket wheels 18 and 19 mounted on an idler shaft 21, the pairs of sprocket wheels being located at opposite ends of the lower housing respectively and mounted adjacent the side walls. The chains 14 and 15 are connected at regular intervals by transverse rods carrying rotatable sleeves 20, the space between the transverse rods being somewhat greater than the diameter of the bun-halves B to be toasted. The end sprockets 16 and 17 for the chains are driven in unison by a motor M located in the lower housing and connected through suitable reduction gearing to the shaft 40 on which the driven sprockets 16 and 17 are secured. As apparent from FIG. 1, the endless bun conveyor moves along on the top of the toasting plate from the lower end of the plate to the upper end, moving below the plate on the return flight, the direction of travel of the conveyor being indicated by the arrows X in FIG. 1. Suitable bearings for the sprocket wheel shafts are mounted in the housing walls. The end wall of the lower housing 10 adjacent the upper driven sprockets 16 and 17 is provided with a discharge opening 10a (FIG. 1) so that the bun-halves, upon reaching the upper end of the toasting plate 12, will be discharged from the device onto a tray or other suitable receptacle indicated at 22.

The toaster as thus far described resembles commercial bun toasters at present on the market except for the fact that the toasting plate 12, instead of being positioned in the customary horizontal plane, is located in an inclined plane so that the bun-halves move upwardly along the inclined toasting plate during the toasting operation. This is a novel and important feature to which reference will be made later.

Figure 4:
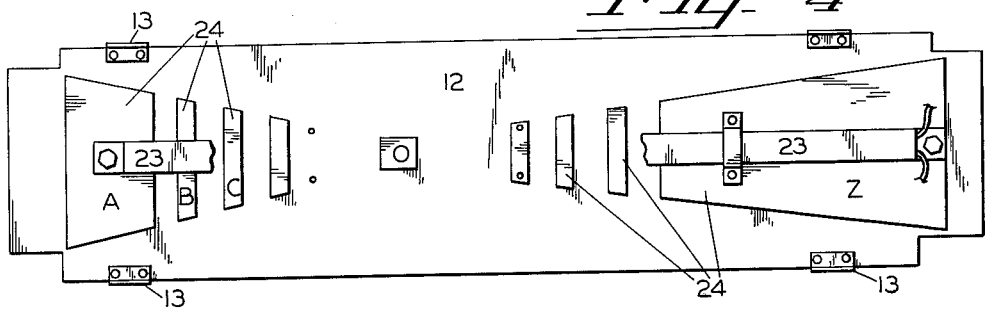
FIG. 4 is a bottom plan view of the toasting plate by itself, this view being taken on the section line indicated at 4—4 in FIG. 1, but drawn to a smaller scale, a portion of the heating element being shown broken away for clarity.

An electric heating element 23 (FIGS. 1, 3 and 4) is mounted below the underside of the toasting plate 12 and extends substantially the entire length of the toasting plate below the center line of the same. A series of separated heat conductors 24, first of decreasing size and subsequently of increasing size, are secured along the underside of the toasting plate 12 and are thus interposed between the heating element 23 and the toasting plate. Since these heat conductors are separated from each other there is an air space between the heating element 23 and the toasting plate in the intervals between the heat conductors. The purpose of this arrangement of heat conductors is to prevent overheating of the toasting plate where moderate and limited heat is desired and to have the amount of heat delivered to the toasting plate from the continuous heating element 23 varied at different points along the toasting plate to correspond to a preferred predetermined toasting process.

Thus the buttered bun-halves are placed by the operator on the lower or left end of the toasting plate 12 (as viewed in FIG. 1) and then are moved along by the conveyor towards the right or upper or discharging end of the toasting plate. Beneath the lower or left hand end of the toasting plate 12 is located the first heat conductor 24, indicated separately at A in FIG. 4, and this first heat conductor acts to conduct heat from the end of the heating element 23 to the lower end of the toasting plate. This first heat conductor A extends over sufficient area to cause this portion of the toasting plate to be heated sufficiently to increase considerably the tendency for the butter on the contacted bun faces to penetrate into the buns. Not only does this produce a desirable condition in the buns but it also reduces the amount of butter which otherwise would continue to be given off from the buns onto the toasting plate. During this first stage however the heating of the buns should take place gradually, and since there will be a surplus of butter on the contacted faces until more penetration of the butter takes place, the toasting plate must be kept from reaching a temperature high enough to scorch this surface butter. Consequently the next successive heat conductors B and C are smaller in order to prevent the heat in the toasting plate from building up too rapidly. This situation continues until a location (such, for example, as that indicated at the area O in FIG. 4) is reached at which the actual toasting of the face of the heated bun-half should begin. This is generally at the location where the upper housing 11 begins. It has been found that the greatest amount of butter scorching on the commercial bun toasters invariably occurs at this general location, together with the greatest accumulation of butter deposits on the toasting plate. In the toaster of the present invention, however, the decrease in the size of the heat conductors directly in contact with the toasting plate prevents the heat in the toasting plate from building up too rapidly up to this point to scorch the deposits of butter. Furthermore, since the butter is in a melted state, the deposits of butter will not remain stationary on the toasting plate, but, due to the slope of the plate, will move down the plate towards the starting end and eventually drain off from the lower end of the plate, should the deposits become excessive. In actual practice it has been found that the heat in the area around O can and should be kept from exceeding 390° F., which maximum temperature for this area will produce very satisfactory results without butter scorching. From here on to the upper end of the toasting plate the temperature of the plate should increase rapidly, to at least 420° F.

By the time the actual toasting of the bun face should begin the butter which has not penetrated the bun will have been deposited on the toasting plate. Therefore from the location, referred to as the area O in FIG. 4, the heat conductors are increased in size to cause the temperature of the toasting plate to build up rapidly and a large conductor, such as that shown on the right at Z in FIG. 4, increases the temperature sufficiently to produce browning of the toasted bun face. This browning of the toasted buttered face, without any actual scorching of the butter, is the condition most highly desired for the finished product. The temperature of the toasting plate therefore should be increased at least to 420° F.

A pair of endless chains 31 and 32 (FIGS. 1, 2 and 3) are located in the upper housing 11. At the lower end of their course these chains pass around sprockets 33 and 34 (FIG. 2) secured on a shaft 35 which is mounted in suitable bearings supported by the side walls of the housing. At the other or upper end of their course these chains pass around sprockets 36 and 37 secured on a shaft 38. A gear 39 secured on the shaft 38 meshes with a gear 41 secured on the driven shaft 40 in the lower housing 10 when the upper housing 11 is set in place on the lower housing. The gears 39 and 41 are exactly the same size and thus, when the two gears are brought into mesh, the endless chains in the upper housing will travel at the same speed as the chains of the conveyor in the lower housing.

The chains 31 and 32 are connected by a series of pairs of parallel transverse rods 42 (FIG. 2), the rods in each pair being close together. The ends of these pairs of transverse rods extends beyond the chains and pass through end blocks 43. A central stem 44 (FIG. 1) connected to a disc weight 45 is reciprocally disposed in each block, the opposite end of the stem being headed to prevent the stem slipping through the block.

When the weights 45, having been moved along in the upper course of the chains 31 and 32 (from right to left as viewed in FIG. 1), move downwardly at the left or lower end of their course they engage a curved metal strip 47 which holds the disc weights up against their carrying blocks 43 until they are in position to drop down onto the tops of the respective bun-halves.

The use of similar weights in various bun toasting machines is old, as previously mentioned, but in such machines heretofore there has been no weight control which would prevent weights, which bear down sufficiently on harder or staler bun-halves, from pressing down too far on very fresh bun-halves and thus spoiling the appearance of fresh bun-halves by partially crushing them. To remedy this difficulty the device of the present invention is provided with a lower weight restraining guide bar 48 (FIGS. 1, 2 and 3) which has its ends secured in the end walls of the upper housing 11. This guide bar is centrally positioned, is parallel to the toasting plate 12 when the upper housing is set in place on the lower housing, and is rigid enough to support the combined weight of the disc weights 45, their blocks 43 and the portion of the two chains 31 and 32 in the lower course of these chains. The pairs of parallel transverse rods 42 slide along on this guide bar 48 and thus cause the guide bar to support the weight of the chains and blocks, and also, in the case of very fresh, soft, bun-halves, to support part of the weight of the disc weights 45 and limit the extent to which the weights can drop down and thus prevent any possibility of the weights squashing the thickness of very fresh and soft bun-halves. The guide bar 48 is positioned at such distance above the toasting plate 12, when the housing 11 is set in position on the lower housing 10, that the maximum extent to which these disc weights can drop down will be sufficient for pressing down all bun-halves without causing the crushing of very soft bun-halves. In this way the same disc weights can be used satisfactorily to hold down very fresh bun-halves as well as bun-halves which are staler and not so soft and which require considerably more weight pressure to keep the toasted surface from becoming concave.

Figure 7:
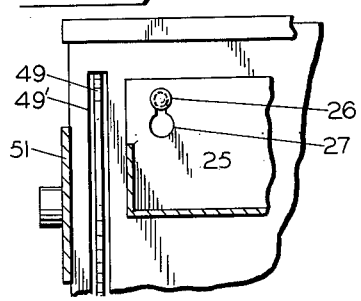
FIG. 7 is a fragmentary sectional elevation taken on line 7—7 of FIG. 6.

To facilitate the application of butter to the sliced faces of the bun-halves before they are placed on the toasting plate 12, a trough-like container 25 (shown best in FIG. 6) is removably secured on the outside of the upper housing 11 at the front. In the device illustrated this butter container 25 is removably mounted on a pair of headed studs 26 (FIGS. 5 and 7) which extend from the outer face of the front wall of the housing 11 and are engaged by the reduced upper ends of two slots 27 (one of which is shown in FIG. 7) which are provided in the adjacent wall of the container 25. Thus the butter container has considerable contact with the front wall of the housing 11, with the result that the heat from the housing maintains the butter in the container in melted condition while the bun toaster is in operation.

An additional sprocket wheel 28 (FIG. 6) is secured on the shaft 35 on which the sprockets 33 and 34 for the upper chains 31 and 32 are secured. A sprocket chain 29 connects this sprocket wheel 28 with a sprocket pinion 30 which is secured on a shaft 44 (see also FIG. 5) and this shaft 44 is mounted in the side walls of the housing 11 in a manner similar to that of the shaft 35 and located above the shaft 35. A pair of discs 48 and 49 are secured on the shaft 44 near the respective sides of the housing 11. The disc 49 is shown in FIGS. 5 and 6 and a portion of the disc 48 is shown in FIG. 5. These discs are identical and extend forwardly through the slots provided in the front wall of the housing 11, such as the slot 49' for the disc 49 shown in FIGS. 5 and 7.

A pair of brackets 50 and 51 are secured on the outside of the side walls of the housing 11 and extend forwardly from the front of the housing 11. An arm 52 is pivotally mounted at its front end on the front end of the bracket 50 by means of pivot bolt 52' (FIG. 5). A pair of spaced roller wheels 54 and 55 are mounted for rotation on the arm 52. The rear roller wheel 55 rests on the disc 48 and thus supports the rear end of the pivoted arm 52 and therewith the forwardly spaced roller wheel 54.

Similarly an identical arm 53 is pivotally mounted on the bracket 51 by the pivot bolt 53' and carries an identical pair of spaced roller wheels 56 and 57, and the rear roller wheel 57 similarly rests on the disc 49 and thus supports the arm 53 and with it the other roller wheel 56.

A butter roller 58 is mounted on a shaft 59. The ends of this shaft 59 rest on the spaced pair of roller wheels 54 and 55 and 56 and 57 respectively, as shown in FIG. 5. The butter roller 58 preferably is composed of two identical cylinders 58A and 58B which have inner end walls placed adjacent each other and rigidly welded to the shaft 59. The opposite ends of these cylinders 58A and 58B are open.

It will be apparent that the rotation of the discs 48 and 49 will cause rotation of the roller wheels 55 and 57 and therewith of the shaft 59 and roller wheels 54 and 56, and the rapid rotation of the shaft 59 will produce rapid rotation of the butter roller 58. Consequently a considerable quantity of the melted butter will be carried on the surface of the butter roller during the operation of the device. When the cut surface of a bun-half is momentarily brought into contact with the butter roller this stops the roller temporarily during which moment the butter from the surface of the roller is sopped onto the bun face. Upon removal of the bun-half from contact with the roller the rotation of the roller is resumed.

The fact that the butter roller is hollow, with the two ends entirely open, is an important feature, since the butter container or trough can hold a considerable amount of butter while its dimensions are not much greater than those of the butter roller, and, since the melted butter circulates freely inside the two cylinders which compose the butter roller and flows around on the inside of the cylinder walls, the butter is kept in a constant state of agitation and the butter solids are kept in solution. It is desirable that the butter roller should have a diameter at least equal to the diameter of the bun-halves, and with the hollow roller this is possible without having the butter container excessively large, while also still enabling a considerable supply of butter to be carried in the container. By having the length of the butter roller equal at least to twice the diameter of the buns it is possible for the operator to take a bun-half in each hand and butter the two halves simultaneously at a saving of time. Obviously seasoning can be added to the butter in the container, should this be desired, or a seasoned mixture can be substituted for the butter itself. The butter roller is readily removable since it has only to be lifted from the two pairs of roller wheels on which its shaft rests.

This improved bun toaster, when properly set up and arranged, consequently enables the operator to butter and toast bun-halves in rapid succession with very little effort and attention required. The toaster serves equally well for very soft fresh buns or for firmer buns, and finally, due to the fact that the accumulation and burning of grease on the toasting plate is largely eliminated, the problem of maintaining the toaster in proper operating condition is greatly simplified.

I claim:

1. In a sliced bun toaster of the character described, an upwardly sloping toasting plate, conveyor means for sliding buttered bun-halves along said plate from the lower to the upper end, a butter container mounted on said toaster and located convenient to the lower end of said plate, and near enough to said plate to be heated by the heat from said plate, and a hollow, open, driven butter-applying roller in said container, means for rotating said roller, and means for heating said toasting plate, said heating means including a heating element extending along beneath said plate for substantially the entire length of said plate and a series of heat conductors between said element and said plate, the size and arrangement of said conductors being such that the heat in the lower portion of said plate will be restricted to a moderate temperature and then considerably increased in the upper portion of said plate, whereby any deposits of butter on said toasting plate will flow down said plate instead of accumulating thereon, and whereby butter deposited anywhere on the lower portion of said plate will be kept from reaching a burning temperature.

2. A toasting machine adapted for use with sliced buttered bun-halves, said machine including an upwardly sloping toasting plate, conveyor means for sliding buttered bun-halves along said plate from the lower to the upper end, means for heating said toasting plate, said heating means including a heating element extending along beneath said plate for substantially the entire length of said plate and a series of spaced heat conductors between said element and said plate, the size and arrangement of said conductors being such that the heat in the lower portion of said plate will be restricted to a moderate temperature and then considerably increased in the upper portion of said plate, whereby any deposits of butter on said toasting plate will flow down said plate instead of accumulating thereon, and whereby butter deposited anywhere on the lower portion of said plate will be kept from reaching a burning temperature, an upper housing removably mounted above the upper portion of said toasting plate, an endless conveyor in said upper housing, means for moving said first mentioned conveyor means and said second endless conveyor in unison, a series of weights carried by said second endless conveyor with said weights adapted to rest on the tops of the traveling bun-halves, guiding limit means for said weights limiting the extent to which weights can press downwardly on the bun-halves, whereby to prevent excessive crushing in the case of soft buns, a butter container mounted on said upper housing, and a butter-applying roller in said roller container driven by connection with said endless conveyor in said upper housing.

3. In a toaster of the character described for buttered bun-halves and the like, an upwardly sloping toasting plate, means for siding buttered bun-halves with their buttered faces down along on said plate from the bottom end to the top end, an upper housing assembly extending along above the upper portion of said plate, an endless conveyor in said upper housing moving in unison with said means, a series of weights carried by said conveyor so arranged as to rest on the tops of said bun-halves during the travel of said bun-halves beneath the lower throw of said conveyor, a rigid guide bar for the lower throw of said endless conveyor and for said weights while being conveyed by the lower throw of said conveyor said guide bar so positioned and arranged that the lower throw of said conveyor will slide along on said guide bar, said guide bar extending parallel to said plate so as to maintain the lower throw of said conveyor in parallelism with said plate and limiting the extent to which said weights can press downwardly on said bun-halves, whereby to prevent excessive crushing of soft bun-halves, and heating means for applying a varying amount of heat along said plate from the bottom end of said plate to the top end and so contructed and arranged that the amount of heat applied to said plate will decrease from the bottom end of said plate until said plate reaches said upper housing and then increase from there to the upper end of said plate.

References Cited in the file of this patent
UNITED STATES PATENTS

| | | |
|---|---|---|
| 911,408 | Jensen | Feb. 2, 1909 |
| 1,753,879 | Carter et al. | Apr. 8, 1930 |
| 2,225,068 | Marriott | Dec. 17, 1940 |
| 2,703,521 | Marriott | Mar. 8, 1955 |